R. B. DOUGLAS.
STRIPPER HARVESTER AND OTHER COMB MACHINE.
APPLICATION FILED OCT. 22, 1908.
971,180.
Patented Sept. 27, 1910
2 SHEETS—SHEET 1.
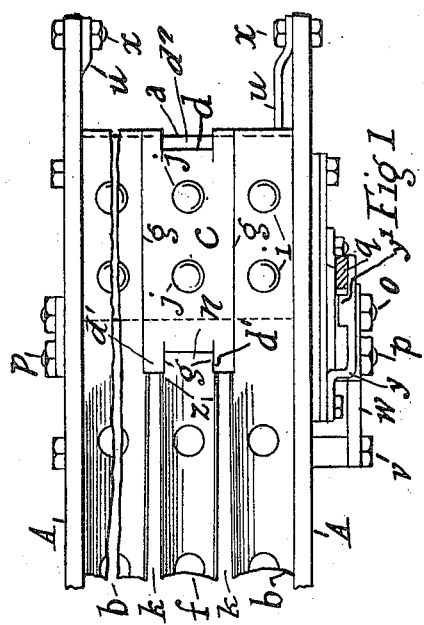
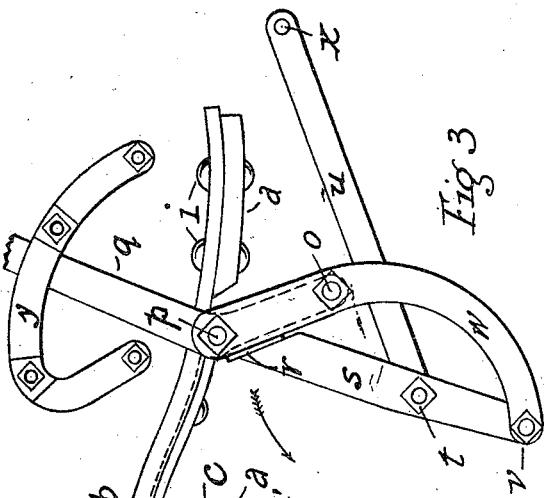
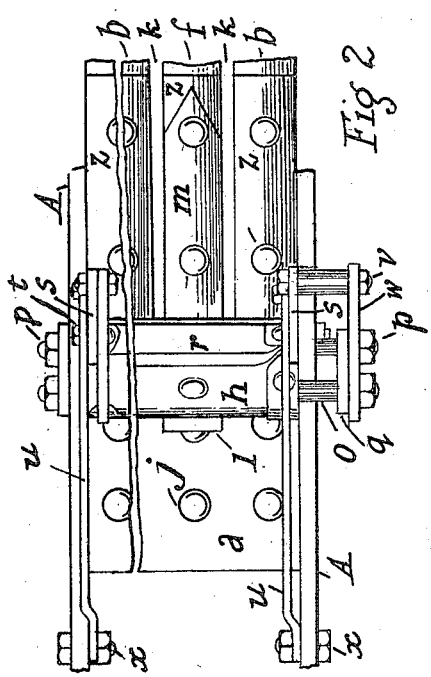
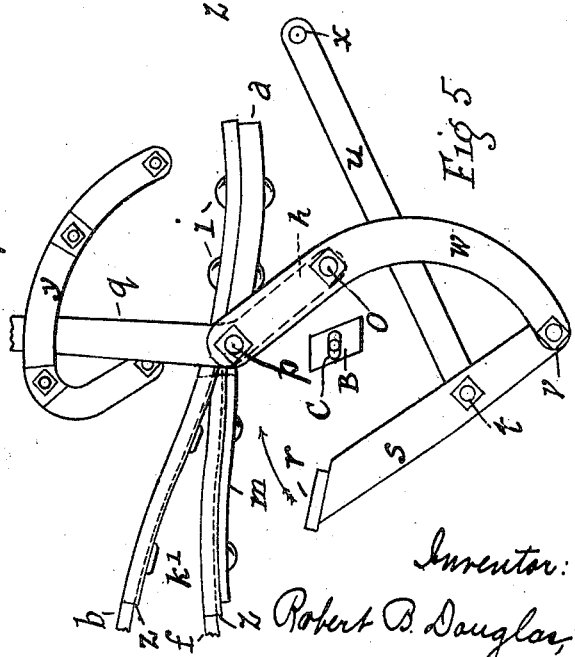
Witnesses:
L. E. Barkley.
E. G. Gibbs
Inventor:
Robert B. Douglas,
by Frank S. Appleman
atty

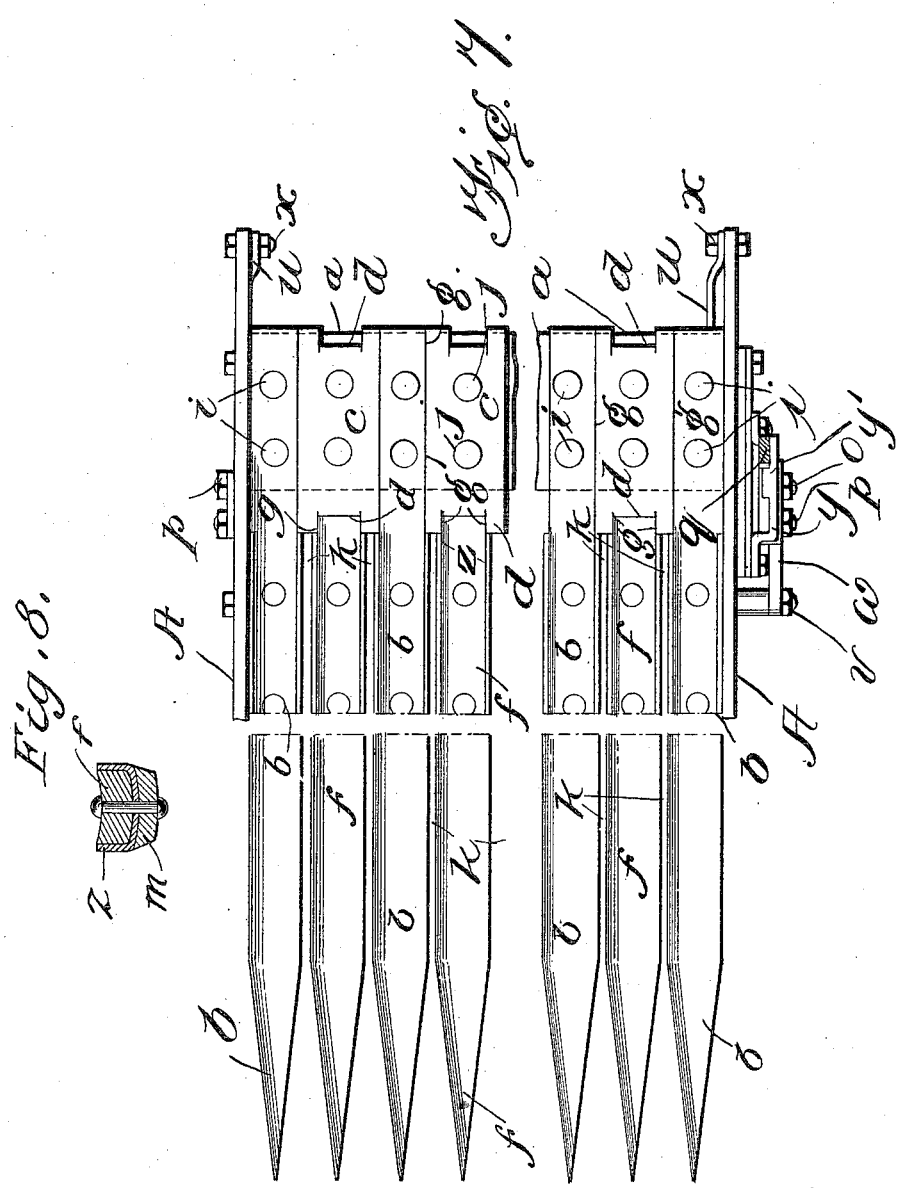

UNITED STATES PATENT OFFICE.

ROBERT BREMNER DOUGLAS, OF LAANECOORIE, VICTORIA, AUSTRALIA, ASSIGNOR OF ONE-FOURTH TO GEORGE FREDERICK MARTIN, OF NEWBRIDGE, AUSTRALIA.

STRIPPER-HARVESTER AND OTHER COMB-MACHINE.

971,180.

Specification of Letters Patent. Patented Sept. 27, 1910.

Application filed October 22, 1908. Serial No. 459,049.

*To all whom it may concern:*

Be it known that I, ROBERT BREMNER DOUGLAS, a subject of the King of Great Britain and Ireland, &c., residing at Laanecoorie, in the State of Victoria, Commonwealth of Australia, have invented certain new and useful Improvements in and Relating to Stripper-Harvesters and other Comb-Machines; and I do hereby declare the following to be a full, clear, and exact description of the invention, such as will enable others skilled in the art to which it appertains to make and use the same.

This invention relates to improvements in comb harvesting machines and provides effective means for clearing the comb of obstructions whenever required without stopping the machine in the field; the wear of the side or adjacent rear edges of the comb teeth is coped with, and other advantages are secured. Large quantities of valuable grain are gathered that would otherwise be lost or left behind on the field.

There is used with this invention, a suitably fixed or supported toothplate to which alternate comb teeth are fixed the remaining alternate teeth of the comb being distinct from it; and these remaining teeth are made movable to vary their height in a way to free (or help to free) the comb from any "chokes" that occur. A special or movable toothplate is for example provided and connected to the movable teeth, and adapted to be suitably actuated, as by a lever located in proximity to the driver.

A transverse thruster or clearing member is located under the movable toothplate or comb rear, and is swung or forced forward by suitable means at will as by the said lever. This swinger dislodges matter choking the teeth, and as an auxiliary, to the movable teeth, is useful because some "chokes" which occur need drastic treatment.

The invention comprising the above and other features hereinafter explained, may be carried into effect as herewith illustrated by drawings. Sundry details set forth may be varied or omitted the "claims" hereinafter made not being limited to them, or to the designs, numbers or proportions of parts.

In these illustrations Figure 1 represents a plan view showing parts of the rear of a harvesting machine comb; Fig. 2 shows a plan of the under side of the parts in Fig. 1, the near side of each figure showing the same side of the machine; Fig. 3 is a side view of parts in Fig. 1 the near tooth being broken off nearer the rear to show the tooth next in order. Fig. 4 shows a section of some details. Fig. 5 shows the parts of Fig. 3 in the position temporarily assumed when "choke" removing. Figs. 3 and 5 omit the machine cheeks or side plates. Fig. 6 shows a wear member in cross section. Fig. 7 is a plan view of my invention showing the full length of the two sets of teeth and disclosing their relative positions. Fig. 8 is a view in cross section through one of the movable teeth.

In these drawings A shows cheeks of the harvester; $a$ indicates the usual or any suitable toothplate bolted or fixed to the said machine. Alternate teeth $b$ of the comb are fixed (as by rivets $i$) to plate $a$. There are distance plates $c$ fixed to plate $a$ between each two teeth $b$, there being elongated holes $a'$ through which bolts $j$ pass to allow adjustment of plates $c$. This will also allow for wear.

The ends of the plates $c$ are cut away centrally as at $d$ forming the side tongues $d'$, which latter are of a sufficient width to extend across the teeth interstices $k$ and if desired the inside edges of the tongues $d'$ may be seated on the countersunk ledges or recesses indicated at $g$ which may be formed on the side edges of the teeth $b$ and $f$. This would avoid a narrow slit between the side edges of the distance plates and the teeth. Each plate $c$ extends rearwardly from the rear edge of each movable tooth, and in order that a good joinder between the rear edges of the movable teeth $f$ and the front edges of the distance plates may be attained I provide projecting edges. In the drawings I have shown the edge $d^2$ of the plate $c$ beveled downwardly and the rear edge of the teeth $f$ (Fig. 4) beveled upwardly to overhang the edge $d^2$. Of course, this joint might be made by straight edges to permit the movable teeth to swing upwardly from their normal position as well as downwardly. The ends of the plates $c$ being similarly formed permits of the reversal of the plates to compensate for wear.

A movable toothplate $h$ (see Figs. 2 and 4) is provided, suitably hinged or pivoted or supported, axle $p$ being shown at each end, the same being mounted in any suitable bearings provided on or connected to the machine.

Arms $l$ are fixed to toothplate $h$ (ordinarily in a groove or bed) and project with fronts $m$ between teeth $b$, at a less height. Teeth $f$ are riveted or fixed to fronts $m$. In some cases arms $m$ are integral with part $h$. A short portion at rear of each tooth $f$ projects above part $m$ and is preferably beveled as at $n$ to make a joint with the end bevel or curve of plate $c$ (see Fig. 4) the tooth rear meeting and moving upon the latter when tooth movement occurs. But there may be any other suitable tooth-pivot, support or connection to allow movement varying height.

A lug $o$ integral with plate $h$ projects from the lower side edge of that plate, and is engaged by a lever $q$ the fulcrum of which is or may be axle $p$, the lever extending as shown dotted in Fig. 3, or being so arranged that when the said lever is operated, toothplate $h$ will be so swung as to depress, or raise, teeth $f$ as required. For example it makes the spaces enlarge as at $k'$. The lever $q$, can be moved to depress the teeth $f$, from their normal position if desired, Fig. 5, illustrating them depressed. The teeth fronts are thus lowered considerably as in Fig. 5.

To place teeth $f$ in normal position the lever or the like is brought back to normal, and in practice that may be done almost instantaneously.

Plate $h$ is not necessarily flat as shown. It or the support of movable teeth $f$ is so mounted as to be removable from the machine with said teeth, allowing of repairs or substitution.

Plates $c$ may be varied or omitted so long as teeth $f$ have suitable jointing and support. Teeth $f$ may be used of such width that slots $k$ are as wide or as narrow as suit the condition of the crop to be harvested, and the diherences between different crops.

The thruster, slot-clearer, or swinger, shown by a plate $r$, has any suitable means for actuating it. It may cut, but is effective as a pusher. It extends transversely and is shown with arms $s$ pivoted at $t$ to any suitable supports or straps $u$ whose ends are pivoted by connections $x$ to the machine framing; arms $s$ are also connected as at end $v$ to an actuating arm $w$, which is shown mounted on spindles $o$, $p$, but which is of any construction whereby lever $q$ will actuate the part $r$. If it is not desired to use the swinger it is so mounted as to be removable. By using slotted connections it can also be made adjustable. The arrows in Figs. 3 and 5 show direction of motion of swinger or thruster $r$.

The thruster may be constructed to swing or to otherwise move as close under the teeth interstices as may be predetermined; and when not in action it and the toothplate $h$ may be set as far back from the rear of each space $k$, and as high as predetermined, the relative positions and sizes of parts shown in Fig. 4 for example not being those to which the invention is limited. Wear plates or strips renewable easily are added at will wherever desired.

An adjustable stop (or stops) as B (as with slot C) shown only in Fig. 5 is (or are) suitably fixed as one to each check A of, or flanged side plate or support on, the machine to limit the travel of any part, as toothplate $h$, so that the latter will when required bear against the stop or stops.

$y$ indicates any quadrant or framing having any stop (one—$y'$—Fig. 1, shown) or stops,—as a toothed rack—whereby the lever when adjusted from time to time may be locked, as by using any known form of spring catch.

A wear member is let into each tooth rear, which is recessed at each edge to cause the wear member to set flush in the edges. Wear members $z$ are riveted or removable and of any suitable cross section. In case of wear new ones are substituted,—but obviously this detail can be omitted while still retaining part of the invention of greater importance.

It will be observed that the fronts of the plate $c$ form the rears of two spaces $k$ but are wider than the spaces.

The machines called strippers as well as those called stripper harvesters are included in the comprehensive expression "harvesters" as used in this specification and its claims.

While for the purpose of disclosure reference is had to the accompanying drawings, it will be understood that the drawings illustrate a practical and preferred embodiment of the invention, but it is obvious that modifications might be made without departing from the spirit thereof, and

What I claim is:—

1. In a harvesting machine, the combination of a comb comprising a plurality of alternating fixed and pivotally supported teeth having spaces between their adjacent edges, said edges being straight, and means for swinging said pivotally supported teeth about their pivots to relieve choking by the grain heads, substantially as described.

2. In a harvesting machine, the combination of a plurality of fixed teeth, a tooth plate pivotally supported by said machine and disposed adjacent said fixed teeth, a plurality of movable teeth carried by said pivoted tooth plate and alternating with said fixed teeth, with spaces between the adjacent edges thereof, said movable teeth being held against longitudinal displacement by said pivoted tooth plate, and means for swinging said tooth plate on its axis, substantially as described.

3. In a harvester comb, the combination of alternating fixed and movable teeth having spaces between their adjacent edges, and longitudinally disposed plates at the rear of said teeth extending across said spaces and forming rear edges therefor, substantially as described.

4. In a harvester comb, the combination of alternating fixed and movable teeth having spaces between their adjacent longitudinal edges, and distance plates located between each pair of fixed teeth, each plate being cut away at its forward end providing side projecting tongues adapted to aline with said spaces also providing a centrally recessed edge disposed adjacent to and coöperating with the rear edges of said movable teeth to form a broken joint therewith, substantially as described.

5. In a harvester comb, the combination of alternating fixed and movable teeth with spaces between their adjacent longitudinal edges, distance plates disposed between each pair of fixed teeth and cut away centrally at both ends to form side tongues and a recessed central edge, whereby said tongues project in alinement with said spaces and form rear edges therefor, and whereby said plates may be reversed to compensate for wear, substantially as described.

6. In a harvester comb, the combination of alternating fixed and movable teeth having spaces between their adjacent longitudinal edges, said teeth having side recesses at the rear thereof, and distance plates having their edges set in said recesses and forming rear edges for said spaces between said teeth, substantially as described.

7. In a harvester comb, the combination of alternating fixed and movable teeth having spaces between their longitudinal edges, said movable teeth having their rear ends disposed forwardly of the rear ends of said fixed teeth, distance plates disposed between each pair of said fixed teeth and terminating adjacent the rear end of said movable teeth, said distance plates having recessed forward edges forming tongues at the sides of the recesses; whereby the recessed forward edges of said distance plates form broken joints with said movable teeth and the side tongues are disposed in alinement with the spaces between said teeth forming rear edges therefor, substantially as described.

8. In a harvester comb, the combination of a plurality of spaced fixed teeth, distance plate members extending between said teeth, pivoted tooth members alternating with said fixed teeth and having spaces therebetween, said pivoted tooth members terminating adjacent the forward edges of said distance plate members, and one of said set of members being provided with projecting edges overlapping the adjacent edges of the other set of members, substantially as described.

9. In a harvester comb, the combination of a plurality of alternating fixed and pivotally supported teeth, having spaces between their adjacent longitudinal edges, and longitudinally adjustable distance plates extending between each pair of fixed teeth and coöperating with said pivotally supported teeth to form a broken joint with the rear thereof and to form rear edges for the spaces between said sets of teeth, substantially as described.

10. In a harvester, the combination of alternating fixed and movable teeth having spaces between their longitudinal edges, a thruster extending transversely below said teeth, and means for actuating said thruster, substantially as described.

11. In a harvester, the combination of a plurality of fixed teeth, a pivoted tooth plate extending transversely thereof, a plurality of teeth secured to said tooth plate, and alternating with said fixed teeth with spaces between the longitudinal edges thereof, a pivotally mounted thruster disposed adjacent said tooth plate, and means simultaneously operating said tooth plate and thruster, substantially as described.

12. In a harvester, the combination of a plurality of fixed teeth, a pivoted tooth plate extending transversely below said teeth and disposed at an angle thereto, said tooth plate being provided with a horizontal extension, teeth secured to said horizontal extension and movable therewith, said teeth alternating with said fixed teeth, with spaces between the longitudinal edges thereof, and said movable teeth being provided with rear projecting upper edges coöperating with said horizontal extension to form recesses at the rear of said movable teeth, and distance plates extending between said fixed teeth and having their forward edges projecting within the recesses at the rear of said movable teeth, substantially as described.

13. In a harvester, the combination of alternating fixed and movable teeth having spaces between their longitudinal edges, and having their longitudinal edges partially cut away to form vertical recesses, and one-piece removable wear members, substantially U-shape in cross section, adapted to extend beneath said teeth and having their side walls disposed within said recesses and lying substantially flush with the longitudinal edges of said teeth, substantially as described.

14. In a harvester, the combination of alternating fixed and movable teeth having spaces between their longitudinal edges, said teeth being cut away on their longitudinal edges a portion of their length to provide vertical recesses, and the upper rear faces of said teeth being cut away along their longitudinal edges to form horizontal recesses or seats, removable one-piece wear members fitting within said vertical recesses, and distance plates having their edges seating within said horizontal recesses, substantially as described.

15. In a harvester, the combination of a plurality of fixed teeth, a pivoted tooth plate extending transversely beneath said teeth and disposed at an angle thereto, teeth secured to said tooth plate and movable therewith, said latter teeth alternating with said fixed teeth and providing spaces between their longitudinal edges, an arm connected to said tooth plate, a second arm hinged to said first arm and provided with a thruster bar at its free end extending transversely beneath said teeth, a radius arm pivotally secured at one end to the framework of the machine and at its other end pivotally connected to said thruster bar and arm, and a lever connected to said tooth plate, whereby upon the operation of said lever said movable teeth and thruster bar are conjointly operated, substantially as described.

In witness whereof I have hereunto set my hand in the presence of witnesses.

ROBERT BREMNER DOUGLAS.

Witnesses:
   CHAS. COHEN,
   LESLIE KENLEY,
   BEATRICE M. LOWE.